Figure 1:
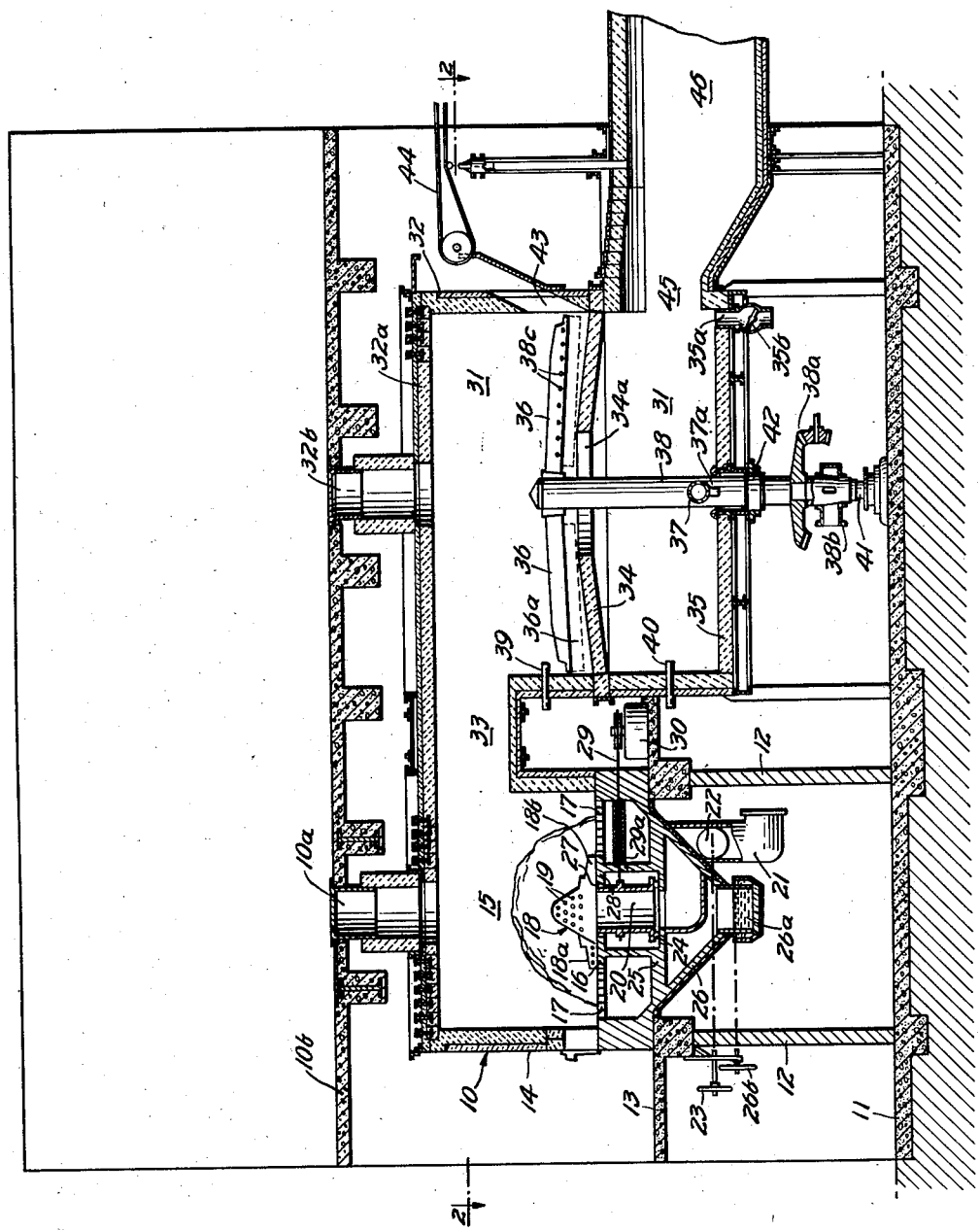

Dec. 4, 1951 M. A. CLIFT 2,577,000
APPARATUS FOR INCINERATING WASTE MATERIAL
Filed Dec. 29, 1948 2 SHEETS—SHEET 1

INVENTOR
MORTIMER A. CLIFT
BY
his ATTORNEYS

Dec. 4, 1951 M. A. CLIFT 2,577,000
APPARATUS FOR INCINERATING WASTE MATERIAL
Filed Dec. 29, 1948 2 SHEETS—SHEET 2

INVENTOR
MORTIMER A. CLIFT
BY Ward, Crosby & Neal
his ATTORNEYS

Patented Dec. 4, 1951

2,577,000

UNITED STATES PATENT OFFICE 2,577,000

APPARATUS FOR INCINERATING WASTE MATERIAL

Mortimer A. Clift, Great Neck, N. Y., assignor to Nichols Engineering & Research Corp., New York, N. Y., a corporation of Delaware Application December 29, 1948, Serial No. 67,969

2 Claims. (Cl. 110—12)

This invention relates to apparatus for drying and incinerating waste materials such as refuse and sewage sludge, among other possible uses. The invention is also related to apparatus adapted for incineration of municipal trash or refuse and the concurrent drying and incineration of sewage sludge.

Apparatus suggested in the past for the simultaneous or concurrent incineration of both municipal trash, garbage and the like and sewage sludge have been subject to a serious disadvantage arising with respect to fly ash, dust and flying charred bits of paper trash and so forth which have been entrained by the air draft in the incinerator and carried up a stack associated therewith and thence into the atmosphere. Thus the region in the neighborhood of the incinerator has under some circumstances become contaminated by such fly ash, dust, and flying charred bits of trash not only by virtue of the presence of such substances but also because of obnoxious odors which may emanate therefrom especially where such substances have not been completely incinerated and, for example, are in a smoldering state.

Prior attempts to solve this problem have not been satisfactory, for example, because screening means which have been employed in association with the incinerators in order to catch such flying substances have become frequently clogged and are difficult to clean. Moreover, upon becoming clogged the combustion of the waste material is retarded, thereby increasing the tendency to give off obnoxious odors.

The invention overcomes the above difficulties and in one aspect thereof is constituted by a trash burning incinerator or the like arranged beside a multi-hearth sewage sludge incinerator in such a manner that the hot gases bearing the fly ash, etc. from the trash burning incinerator are directed into the multi-hearth incinerator and over the sludge material in which it is mixed and disposed of.

The latter incinerator receives dewatered sludge, such as sludge cake, in a moist condition and dries and incinerates it. The chambers of the two adjacent incinerators are in direct communication by means of a passage member at the upper regions thereof, whereby the hot gases bearing said fly ash, bits of charred trash and dust from the trash incinerator pass into the sludge incinerator and assist in providing heat therefor, and under certain circumstances gases are passed from the trash to the sludge incinerator which actually undergo combustion in the sludge incinerator. That is, there is considerable combustion of gases from the first incinerator within the chamber of the second incinerator.

The fly ash, dust and flying charred bits of trash from the trash incinerator, as above mentioned, are caught in the moist and burning sewage sludge in the multi-hearth incinerator and by suitable means are rabbled therewith and thus are mechanically disposed of along with the sludge ash and are kept from flying up the flue or stack which is associated with the sludge incinerator. The gases from the trash incinerator are directed to pass over all of the hearths of the multi-hearth incinerator in order to accomplish the above. There is but one flue outlet for the apparatus which is positioned preferably between the lowest and the next lowest of the hearths of the multi-hearth incinerator.

The patent to Baird, et al., No. 2,015,050, granted September 17, 1935, discloses a multiple hearth furnace apparatus and methods which have gone into wide use for the drying and incineration of dewatered or filtered sewage sludge. The patent to C. W. Nichols No. 2,232,556, granted February 18, 1941, discloses apparatus which also has gone into wide use for the incineration of refuse such as trash, garbage and the like rubbish. The present invention involves a novel combination of various features of these two structures in such a way as to accomplish the above-described advantages and to afford a very economical means for concurrently incinerating municipal trash and sewage sludge. It is, of course, known that with respect to towns of relatively small population it is desirable to incinerate both the sludge and refuse in a single incinerating apparatus because separate sludge and refuse incinerators usually involve too heavy a capital expenditure to be justified by towns of such size. The present invention thus meets a special need of such towns of relatively small population by providing a very economical and effective apparatus for such concurrent and closely associated incineration of refuse and sludge in a single incinerating apparatus.

The refuse, such as trash, garbage and the like, is supplied to a burning pile within a trash incinerator which pile is agitated and supplied with air by apparatus such as disclosed in said patent to Nichols No. 2,232,556. The incinerator or furnace chamber of the trash incinerator is in direct and unobstructed communication with the upper portion of a combustion chamber therefor in which is located a multiple superposed hearth furnace portion which is similar in some respects to the construction of the furnace in said Baird et al. Patent 2,015,050.

The hearths of the multi-superposed hearth structure are formed with discharge ports through which material falls therefrom.

Various, further and more specific objects, features and advantages of the invention will clearly appear from the detailed description given below taken in connection with the accompanying drawings which form a part of this specification and illustrate, by way of example, the preferred form of apparatus for practicing the invention. The invention consists in such novel features and combinations as may be shown and described in connection with the apparatus herein disclosed.

Figure 2:
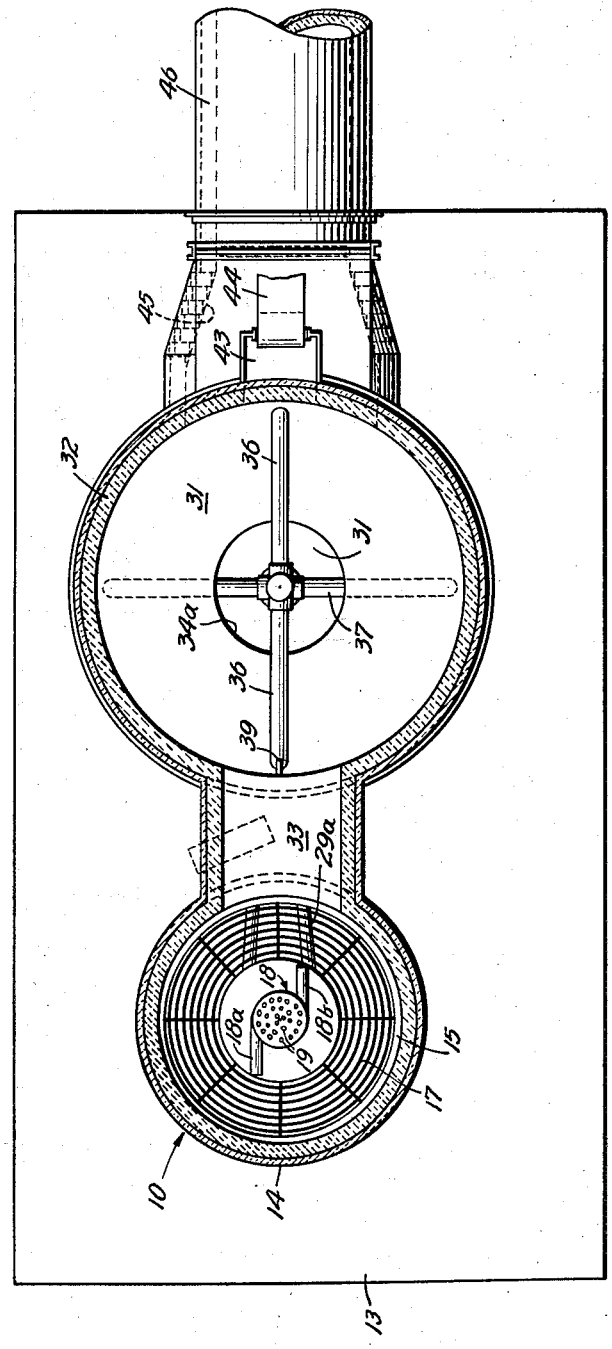

In the drawings:

Fig. 1 is a vertical sectional view of a preferred form of furnace apparatus embodying the invention; and Fig. 2 is a sectional view taken substantially along line 2—2 of Fig. 1.

As shown in Fig. 1, the portion of the incinerator apparatus adapted for the reception and burning of trash, garbage and the like is indicated at 10. If desired, this portion of the apparatus can be constructed in accordance with the disclosure in the above-mentioned Nichols Patent 2,232,556.

The trash incinerator 10 is supported upon a suitable ash pit floor 11 by means of suitable supporting members 12 which give support to a so-called operating floor 13 upon which the main body of the furnace 10 rests.

Means preferably comprising walls of a cylindrical conformation as at 14 are provided for defining a trash incineration chamber 15. The bottom of the chamber 15 may comprise a central stationary refractory hearth area 16 surrounded by an annular grate 17 which may comprise a plurality of separate grate sections arranged around the hearth area 16. At the mid-portion of the fixed hearth area 16 an agitator comprising a rotatable upstanding hollow member of general conical shape is provided as shown at 18.

The cone member 18 either at the upper portion thereof or preferably throughout its surfaces may be provided with air discharge apertures as at 19, the hollow interior of the cone communicating through a hollow supporting shaft 20 with an air supply furnished from a suitable source connected, for example, through conduit 21. The air thus supplied may, if desired, be preheated in any suitable way and the amount may be adjusted by a damper 22 controlled as by a rotatable handle 23 located at a convenient position for operation.

The weight of the rotatable cone structure may be carried by an annular frictionless bearing as at 24 mounted at the base of the shaft 20 upon a suitable beam structure as at 25 which extends across the upper part of an ash pit 26 having an ash pit door 26a controlled by a handle 26b. The upper portion of the shaft 20 may be retained in position by an annular bearing 27 carried by a suitable cylindrical housing and supporting structure 28.

The cone member 18 is preferably rotated by a sprocket and chain arrangement, including, for example, a sprocket chain 29 which passes over a suitable sprocket secured to the hollow shaft 20 and also over a sprocket which is driven by, for example, an electric motor as at 30. It is desirable for the sprocket chain 29 to have a suitable housing 29a therefor through which it passes beneath the grate area 17 in order to protect same.

The cone member 18 may be provided with arms as at 18a and 18b which are preferably tangentially associated therewith in such a manner that rotation thereof will agitate and advance the pile of rubbish outwardly towards the grate 17.

The driving means for rotating the conical member 18 may, for example, be arranged to rotate same once every fifteen to twenty minutes.

The arms 18a and 18b can be detachable and are preferably hollow with air discharge apertures therein along the lengths thereof and also, if desired, at the extremities thereof.

Said cone member and the accompanying tangential arms when rotated will serve to agitate the pile of refuse while at the same time gradually advancing the material toward the periphery of the pile, as it becomes well ignited and burned, and over the grate area. The air from conduit 21 affords efficient combustion, being introduced to the burning material through the ports 19 in the conical member and also through the ports in the tangential arms 18a and 18b.

Hot gaseous products of combustion arise in the chamber 15 and are directed into a combustion chamber 31 in which are located a plurality of superposed generally horizontal hearths with which are associated rabbling means for the incineration of dewatered sludge in a manner to appear below.

The combustion chamber 31 serves the dual purpose of, as above mentioned, (a) a combustion chamber for furnace 10 and also (b) a housing for the multi-hearth sludge incinerator. The hearths of said latter incinerator are superposed and are formed with openings therein through which the waste material falls in response to agitation and movement by the rabbling means.

The hot gases of combustion from the furnace 10 are forced over the hearths of said superposed multi-hearth structure and thence through an outlet at the bottom of the latter to a suitable stack.

Means defining the combustion chamber 31 are indicated as at 32 and preferably are constituted by walls of a cylindrical conformation as indicated in Fig. 2. It is desirable normally for the diameter of the combustion chamber 31 to be somewhat larger than that of the furnace or trash incinerator 10 because usually a larger area is required over which the rabbling action must take place on the sludge material introduced into the chamber 31.

The combustion chamber 31 is located directly beside the furnace 10 and is of substantially equal depth.

The trash incinerator 10 is formed with an opening as at 10a for the introduction of rubbish, garbage and the like. The opening 10a is at a level normally termed the charging floor, the total height of the trash incinerator being the distance between the ash pit floor 11 and such charging floor indicated as at 10b.

The combustion chamber 31 containing the superposed hearths is located between said charging floor 10b and ash pit floor 11. Thus in the apparatus herein described it is unnecessary to construct an extremely high incinerator, that is, it is unnecessary to place the superposed hearth structure above the trash incinerator.

The chamber 31 is in direct communication with the chamber 15 by means of a passage member 33 directly interconnecting the upper or top regions of both chambers. Thus there is free and unobstructed communication between chambers 15 and 31 whereby the above-mentioned fly ash, dust and flying bits of charred trash can be carried promptly into the combustion chamber 31 where they can mix with the moist sludge in a manner more fully to appear hereinafter and be rabbled therewith and dried, incinerated and thereafter disposed of. Thus there is no danger of any such material passing out of a flue of the apparatus and into the surrounding atmosphere.

The plurality of superposed sludge incinerator hearths are indicated as at 34 and 35. A larger or lesser number of such hearths may be provided if desired or necessary. These hearths are accompanied by rabbling means comprising rabbling arms as at 36 and 37 which are respectively provided with rabbling teeth as at 36a and 37a. The rabbling arms and teeth are for rabbling, agitating, breaking up and advancing the sewage sludge material inwardly and outwardly, respectively, over alternate hearths. The rabble arms are carried by a suitable rotatable central shaft structure as at 38. The rabble teeth upon the uppermost of the two hearths are directed at an angle to advance the sludge material inwardly of this hearth so that it falls through a central discharge port as at 34a onto the hearth 35. At the latter hearth the rabble teeth 37a are directed at angles to advance the sludge outwardly to fall through peripheral discharge openings as at 35a having associated therewith a suitable outlet valve member as at 35b.

The shaft 38 can be driven by a suitable electric motor (not shown) from which power is transmitted through a conventional bevel gear arrangement as at 38a. The rabbling structure preferably should be rotated at a rate somewhat faster than the agitator or conical member 18, for example, at a rate of one or two revolutions per minute.

Two rabble arms are provided as shown for each hearth. However, if desired, additional arms may be employed and some of the rabble teeth may be positioned at an angle to perform a so-called "back rabble" function whereby the treatment of material is prolonged on certain of the hearth areas.

In order to assist in speedy drying and incineration of the sludge material upon the hearths 34 and 35 suitable fuel nozzles as at 39 and 40, respectively, are employed in association therewith. One or more such nozzles can be employed in each of such hearths. The nozzles direct thereupon fuel for burning in the combustion chamber 31, the heat of combustion from such fuel being augmented by heat from the trash incinerator 10. Also any unburned gases from said latter incinerator will be ignited and burned in said chamber 31.

The rotatable shaft 38, as shown, is made hollow as are the rabble arms 36 and 37. In order to provide suitable cooling for such shaft and arms, air is directed therethrough under pressure through a suitable inlet as at 38b, the rabble arms being provided with suitable outlet orifices through which the air can pass, as at 38c.

The rotatable shaft 38 is preferably supported in a so-called "foot step bearing" as at 41 and by a ring bearing at 42 for holding the shaft rigidly in a vertical position but permitting rotation thereof.

The means defining the sludge incinerator chamber, namely, walls 32 are provided with a suitable top or cap 32a having formed therein a charging opening 32b. If desired material to be acted upon by the superposed hearths may be introduced through the opening 32b. However, it is more desirable to introduce such material through a chute as at 43 having an outlet which directs material to the periphery of the upper hearth 34, thereby giving full effect to the upper rabbling arms 36. The dewatered sewage sludge may be introduced through the chute 43 from a suitable belt conveyor means as at 44. The sludge as thus introduced may comprise filter cake as obtained from the treatment of the sludge with vacuum filters. However, it is not essential that the sludge be in the form of filter cake, as in small towns, sewage drying beds are widely used which require less capital expenditure. Drying bed sludge may be handled in this equipment as easily and economically as filter cake.

Between the lowermost hearth 35 and the one next above, 34, an outlet 45 is provided for a flue 46 which is in direct communication with a suitable stack (not shown).

In operation, the chamber 15 is charged with a pile of waste material, as indicated in the drawings. Air in suitable quantities is directed to the conical agitator member 18 through the conduit 21 and the motor 30 will rotate said member at a suitable rate, such as once every fifteen or twenty minutes. The waste material in the chamber 15 is gradually advanced toward the grate 17. However, some fly ash, dust and flying bits of paper, which may not be thoroughly incinerated, will pass through the passageway 33 into the combustion chamber 31 and thence to the plurality of superposed hearths. Moreover, the hot gases from the chamber 15 will augment the heat necessary for drying and incinerating the sludge upon the superposed hearths 34 and 35. Also certain of the gases from the chamber 15 will actually undergo combustion in the region of the hearths 34 and 35, thereby further augmenting the heat supplied by the fuel which issues thereto through the nozzles 39 and 40.

The moist and dewatered sludge filter cake or the like is directed to the chamber 31 through the chute 43 via the conveyor 44 where it is subjected to the drying and incinerating action of the sludge incinerator and is moved first inwardly of the hearth 34 and thence through the opening 34a through which it falls onto the lowermost hearth 35. The above-mentioned fly ash, dust and charred bits of paper, trash and the like from the chamber 15 are caught and rabbled with the moist and burning sewage sludge and thus are mechanically disposed of along with the sludge ash and are kept from flying up the flue. The gases of combustion and the air which has been thus stripped of such fly ash, dust and flying charred bits of trash issues through the opening 45 and thence to the flue 46 and stack, there having been eliminated the danger of contaminating the region surrounding the incinerator by such flying material which, under other circumstances, may not be completely burned.

There is thus provided a novel incinerator apparatus for concurrently incinerating both trash and sewage sludge in such a manner that the gases issuing from the incinerator apparatus are entirely free of any fly ash, dust and flying charred bits of trash. Moreover, one or more hearths can readily be installed in the combustion chamber 31 without materially affecting the clearance between the charging floor and the ash pit floor. Furthermore, in view of the fact that the combustion chamber 31 can be and is more flexible as a matter of design in calculating its diameter than is the trash incinerator 10, it is possible to expand or increase the diameter of the combustion chamber 31 a substantial amount over that of the trash incinerator, thereby increasing the efficiency of the overall operation of the apparatus. Also, in some cases the heat of the burning sludge, even though introduced in a quite moist condition, when supplemented by the heat of the burning trash as obtained from chamber 15, is enough to accomplish satisfactory sludge incineration without the necessity for introducing any fuel as through the nozzles 39 and 40. The hearth 34 is a sludge drying hearth and it is possible to dispose the flue outlet 45 at such a location between the hearths 34 and 35 that moisture laden gases from the hearth 34 will pass through the hearth opening 34a and be swept out of the chamber 31 without interfering with combustion upon the lower hearth or at least without interfering with combustion upon those areas of the lower hearth which are opposite to the flue outlet.

Although only a single embodiment of the present invention has been illustrated and described in detail, it is to be expressly understood that the invention is not limited thereto. Various changes may be made in the design and arrangement of the parts without departing from the spirit and scope of the invention as the same will now be understood by those skilled in the art. For a definition of the limits of the invention, reference will be made primarily to the appended claims.

What is claimed is:

1. Incinerating apparatus including means defining a furnace chamber having an ash pit floor therebeneath, a central floor area of said chamber comprising a stationary hearth, a grate surrounding said hearth, means rotatable about a generally vertical axis through the mid-portion of said hearth for agitating material on said hearth and for gradually advancing such material outwardly onto said grate, an ash hopper positioned beneath said grate and above said ash pit floor, means defining a gas combustion chamber positioned at one side of and adjacent to said furnace chamber defining means and substantially equal to the latter in depth, a passage member interconnecting said furnace and combustion chambers near the respective top regions thereof, said means defining said combustion chamber having an outlet below the level of said passage member, a plurality of superposed hearths located in said combustion chamber between said passage member at such upper regions and the outlet therebelow in said combustion chamber, and a central vertical rotatable shaft carrying rabbling means for agitating and advancing material over each of said hearths in succession, each of said hearths being formed with discharge ports through which the material falls therefrom.

2. Incinerating apparatus for drying and burning waste material comprising in combination, a furnace for trash material and the like having a furnace chamber in which the material is incinerated, a central floor area of said furnace comprising a stationary hearth, a grate surrounding said hearth, an agitator rotatable about a generally vertical axis through the mid-portion of said hearth for agitating material thereon and for gradually advancing such material outwardly onto said grate, said rotatable agitator having air discharge passages and outlets therein through which air is directed into the material for assisting in combustion thereof, means defining a gas combustion chamber for said furnace, said means being positioned beside said furnace and being substantially equal thereto in depth, the top surfaces thereof being at substantially the same level, a passage member for directly interconnecting the upper regions of said furnace and gas combustion chamber, through which gases, fly ash, dust and the like pass into said chamber, a plurality of superposed hearths located within said means defining the gas combustion chamber, there being a flue outlet between the lowest hearth and the one next above it, and a vertical rotatable shaft carrying rabbling means for agitating and advancing material over each of said hearths in succession, each of said hearths being formed with discharge ports through which material can fall, one or more fuel inlet members associated with each of said hearths for introducing fuel to be burned in the chamber for drying and incinerating sludge material, the uppermost of said hearth being adapted for receiving moist sludge into which dust, fly ash and flying charred bits of trash can fall from said furnace after passing through said passage member.

MORTIMER A. CLIFT.

REFERENCES CITED

The following references are of record in the file of this patent:

UNITED STATES PATENTS

| Number | Name | Date |
|---|---|---|
| 1,838,596 | Uhde et al. | Dec. 29, 1931 |
| 2,015,050 | Baird | Sept. 17, 1935 |
| 2,074,028 | Schilling | Mar. 16, 1937 |
| 2,171,535 | Berg et al. | Sept. 5, 1939 |
| 2,286,309 | Rowen | June 16, 1942 |
| 2,345,497 | Owen | Mar. 28, 1944 |